United States Patent [19]
Yamamoto

[11] Patent Number: 5,406,387
[45] Date of Patent: Apr. 11, 1995

[54] FACSIMILE APPARATUS CAPABLE OF PREVENTING RECEIPT OF UNAUTHORIZED FACSIMILE TRANSMISSIONS

[75] Inventor: Yoko Yamamoto, Hino, Japan

[73] Assignee: Kabushiki Kaisha Toshiba, Kawasaki, Japan

[21] Appl. No.: 215,654

[22] Filed: Mar. 22, 1994

Related U.S. Application Data

[63] Continuation of Ser. No. 27,604, Feb. 25, 1993, abandoned, which is a continuation of Ser. No. 762,442, Sep. 19, 1991, abandoned.

[30] Foreign Application Priority Data

Sep. 20, 1990 [JP] Japan .................................. 2-250686

[51] Int. Cl.$^6$ .............................................. H04N 1/00
[52] U.S. Cl. ...................................... 358/407; 358/400
[58] Field of Search ............... 358/400, 402, 407, 468, 358/440–442

[56] References Cited

U.S. PATENT DOCUMENTS 4,994,926  2/1991  Gordon et al. ..................... 358/400
5,050,006  9/1991  Ogawa ............................... 358/407
5,130,818  7/1992  Tadokoro ........................... 358/407

Primary Examiner—Stephen Brinich
Attorney, Agent, or Firm—Finnegan, Henderson, Farabow, Garrett & Dunner

[57] ABSTRACT

A facsimile apparatus capable of performing the closed communication with specific calling offices by the setting in a called office. The called office previously registers identification data of predetermined calling offices. When a call is received from a calling office, the called office detects the identification data of the calling office from a control signal for standardized transmission control procedures received from the calling office, and compares the detected identification data with the registered identification data. When coincidence between the both identification data is detected, the communication is enabled between these offices.

8 Claims, 6 Drawing Sheets

| ID NUMBERS | REGISTRATION TELEPHONE NOS. ID |
|---|---|
| $ID_1$ | 0 3 3 1 2 3 4 5 6 7 |
| $ID_2$ | 0 3 3 2 3 4 2 1 1 1 |
| ⋮ | ⋮ |
| $ID_m$ | 0 3 3 2 0 0 0 1 0 0 |
| $ID_{m+1}$ | 0 3 3 2 2 2 1 1 1 1 |
| ⋮ | ⋮ |
| $ID_M$ | 0 4 4 4 3 5 2 1 9 9 |

FIG. 2

FACSIMILE APPARATUS CAPABLE OF PREVENTING RECEIPT OF UNAUTHORIZED FACSIMILE TRANSMISSIONS

This application is a continuation of application Ser. No. 08/027,604, filed Feb. 25, 1993, now abandoned, which is a continuation of application Ser. No. 07/762,442, filed Sep. 19, 1991, now abandoned.

BACKGROUND OF THE INVENTION

1. Field of the Invention

The present invention relates to a facsimile apparatus and more particularly, to a facsimile apparatus capable of performing closed communication with other specific facsimile apparatus based on the setting in the side of a called office.

2. Description of the Related Art

A facsimile apparatus which allows communication only with specific calling offices is known. Such communication is called "closed communication".

In a facsimile apparatus of G3 type where option commands are provided, the closed communication is realized by including a closed area data in an option command and making a setting for closed communication at both the calling and called offices.

Since the closed area data must be included in the option command and the setting for the closed communication must be made at both the calling and called apparatuses, the conventional system has the following defects:

(1) The facsimile apparatus cannot perform a closed communication with facsimile apparatuses manufactured by different companies which use different option commands.

(2) Whether a closed communication is determined not at the side of called offices but at the side of calling offices. Therefore, the called office cannot refuse a call from an undesired office.

SUMMARY OF THE INVENTION

In view of the above defects in the conventional apparatus, it is therefore an object of the present invention to provide a facsimile apparatus capable of performing a closed communication even with different sorts of facsimile apparatuses made by different manufacturers. Another object of the present invention is to provide a facsimile apparatus capable of deciding whether to perform the closed communication at the side of called offices.

In accordance with an aspect of the present invention, the above object is attained by a facsimile apparatus which comprises a detector for detecting a calling office identification data for identifying a calling office from a control signal for standardized transmission control procedures received from the calling office; a memory for storing registration identification data of calling offices with which closed communication is to be performed; a comparator for comparing a calling office identification data detected by the detector with a registration identification data stored in the memory and for outputting a coincidence signal when the calling office identification data coincides with the registration identification data; and a control circuit for enabling the closed communication with the calling offices in response to the coincidence signal.

According to the present invention, a facsimile apparatus previously registers identification data of predetermined calling offices. When a call is received from a calling office, the called office detects the identification data of the calling office from a control signal for standardized transmission control procedures received from the calling office, and compares the detected identification data with the registered identification data. When coincidence between the identification data is detected, the communication is enabled between these offices.

With such an arrangement, the called office side can decide whether to perform the closed communication and also can judge whether to perform the closed communication on the basis of the identification data of a calling office included in a control signal for standardized transmission control procedures on facsimile communication. In other words, the judgment can be made without using its option command signals. As a result, the called office can realize the closed communication with different types of facsimile apparatuses made by different manufacturers.

BRIEF DESCRIPTION OF THE DRAWINGS

FIG. 2 is a table illustrating a content in a data memory 7 in FIG. 2;

DESCRIPTION OF THE PREFERRED EMBODIMENTS

The present invention will be explained with reference to the accompanying drawings.

Figure 1:
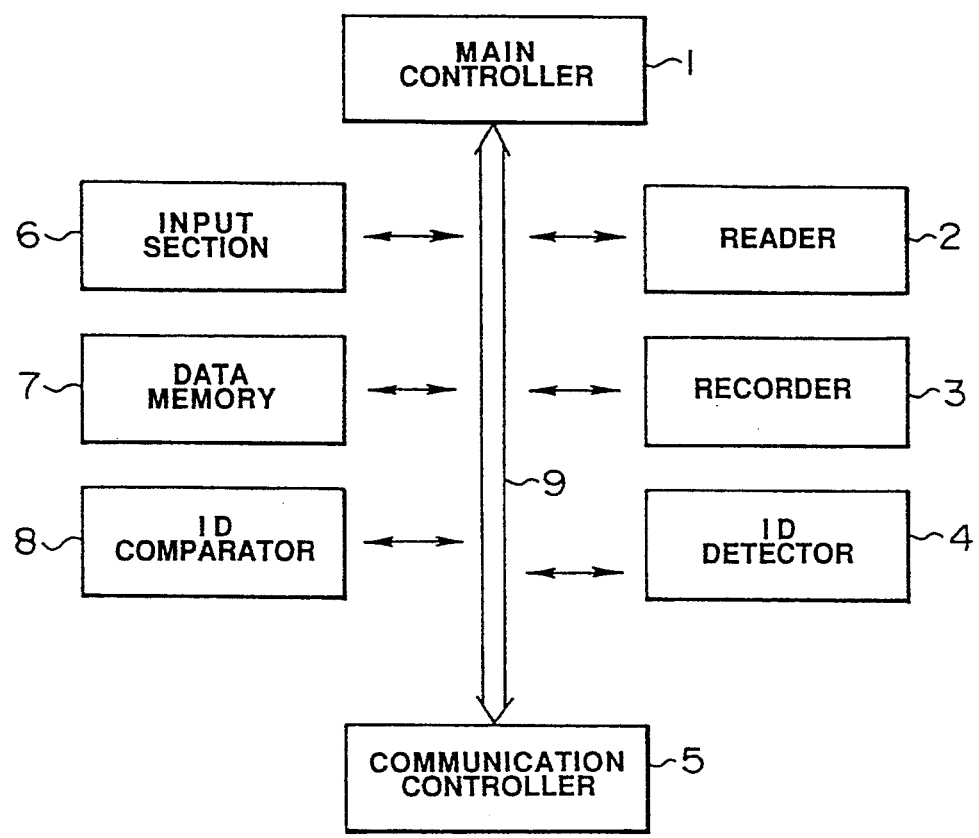
FIG. 1 is a block diagram illustrating an embodiment of a facsimile apparatus according to the present invention.

FIG. 1 shows a block diagram of a facsimile apparatus in accordance with an embodiment of the present invention, in which a main controller 1 comprises a microcomputer as a main device and is connected to a reader 2, a recorder 3, a calling side ID detector 4, a communication controller 5, an input section 6, a data memory 7 and an ID comparator 8 via a bus 9. The main controller performs general control over the entire apparatus. The reader 2, which comprises an image sensor, reads image data on an original document to be transmitted. The recorder 3 produces a received image data in the form of a hard copy. The calling side ID detector 4 detects a calling side ID (identification data) from a transmitting subscriber identification signal TSI or a calling subscriber identification signal CIG contained in a standardized transmission control procedure on the facsimile communication. The ID of the calling office (calling side ID) is, for example, the telephone number of the calling office.

The input section 7 inputs various sorts of data to be used in the facsimile apparatus. In the present invention, the input section is used to enter the ID of a party apparatus which is a calling office desiring closed communication. Such ID is, for example, the telephone number or its abbreviated number of the party apparatus. The data memory 7 stores various sorts of data to be used in this apparatus, such as the ID of the party office (registration ID) desiring the closed communication which is entered through the input section 6. Such ID is, for example, the telephone number or its abbreviated number of the party office.

The ID comparator 8 compares a calling side ID detected at the calling side ID detector 4 with a registration ID previously registered in the data memory 7, and detects whether the calling side ID coincides with the registration ID. The communication controller 5 determines whether or not closed communication is carried out based on the comparison result by the ID comparator 8.

FIG. 2 shows M registration IDs stored in the data memory 7. These M registration IDs are denoted in this specification as $ID_1, \ldots, ID_M$ for explanation purpose.

Figure 3:
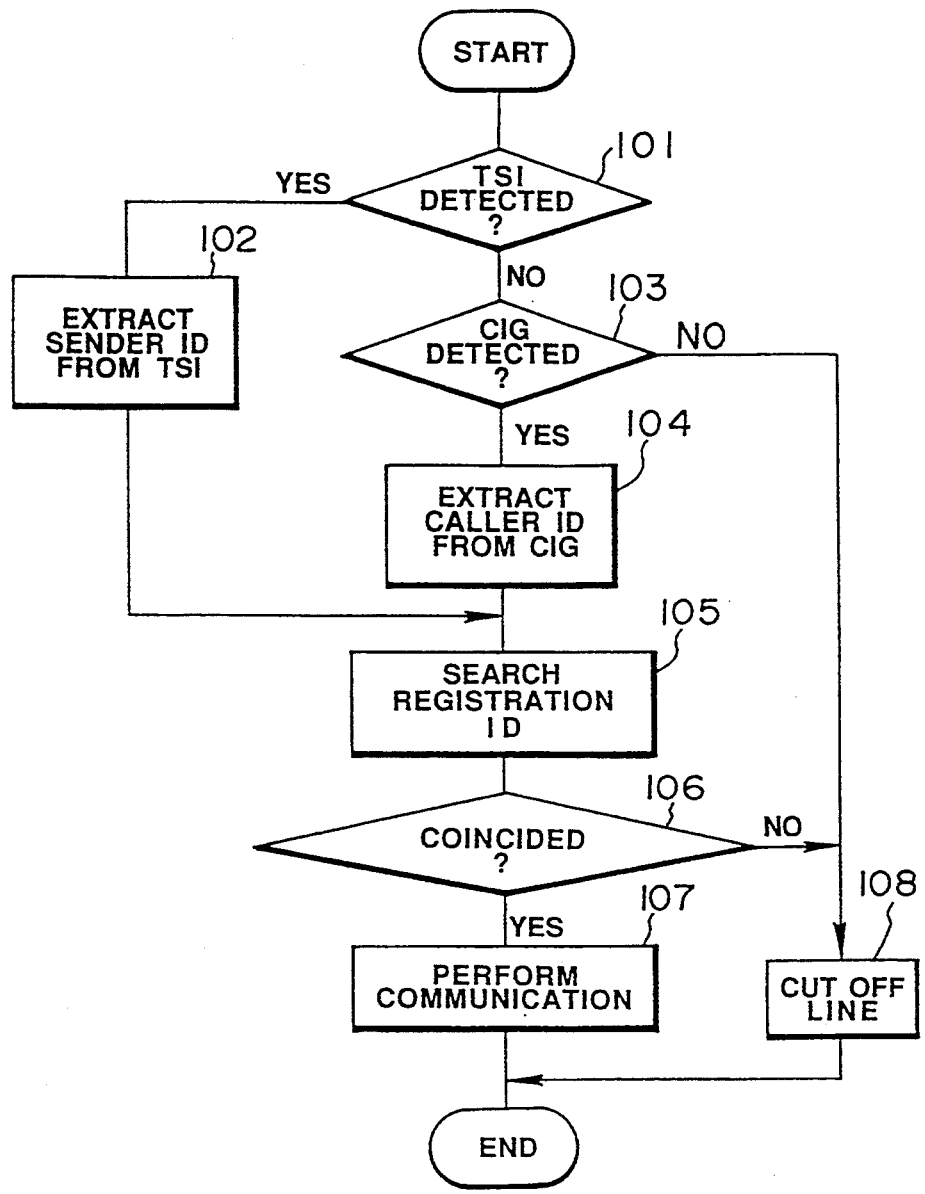
FIG. 3 is a flowchart describing the operation of the embodiment of FIG. 1.

Explanation is now made as to the judgment procedure of the communication controller 5 to judge whether or not closed communication is carried out, by referring to a flowchart of FIG. 3. In the present embodiment, the identification data of the calling office (calling side ID) is detected in a transmitting subscriber identification signal (TSI) or calling subscriber identification signal (CIG) contained in the standardized transmission control procedure on the facsimile communication. In the standard specification, the TSI contains an identification data of a self-terminal telephone number. The CIG also contains an identification data of a self-terminal telephone number.

When a calling tone (CNG) is generated at the calling office side through a dialing operation and a called office receives the CNG, the called office sends a called office identification signal (CED) and a digital identification signal (DIS) back to the calling office. Then, the called office first examines whether the TSI is detected in the signals transmitted from the calling office (step 100).

When the TSI is detected (step 101), the called office extracts the send terminal identification data (send terminal ID), i.e., the calling office ID from the received TSI (step 102) and proceeds to a step 105.

When the TSI is not detected in the step 101, the called office next examines whether the CIG is detected (step 103). When the CIG is detected, the called office extracts the calling terminal identification data (calling terminal ID), i.e., calling side ID from the CIG (step 104) and goes to a step 105. When the CIG is not detected in the step 103, the called side disconnects the line (step 108) and terminates the processing.

In the step 105, the called side retrieves the registration IDs previously registered in the data memory 7 (step 105) and examines whether the calling side ID extracted in the step 102 or the calling side ID extracted in the step 104 coincides with any of the registration IDs (step 106).

When the coincidence is detected, the called side judges that closed communication is possible between the calling side and the called side and performs its usual signal procedure to shift the current mode to a closed communication mode with the calling side (step 107). Then, the processing is terminated.

When coincidence is not detected in the step 107, the called side disconnects the line (step 108) and terminates the processing.

In this embodiment, coincidence between the calling side ID extracted in the step 102 or 104 and the registration IDs stored in the data memory 7 is examined by comparing all the digits of the data in the step 105. Alternatively, the coincidence may be examined by comparing a predetermined number of the digits from the least significant digit of respective IDs, and closed communication may be permitted if coincidence is detected in these digits. With this alternative arrangement, by suitably determining the number of digits to be compared in each ID number, it is possible to improve the processing efficiency and to adjust a range to select the calling side to which closed communication is performed.

Figure 4:
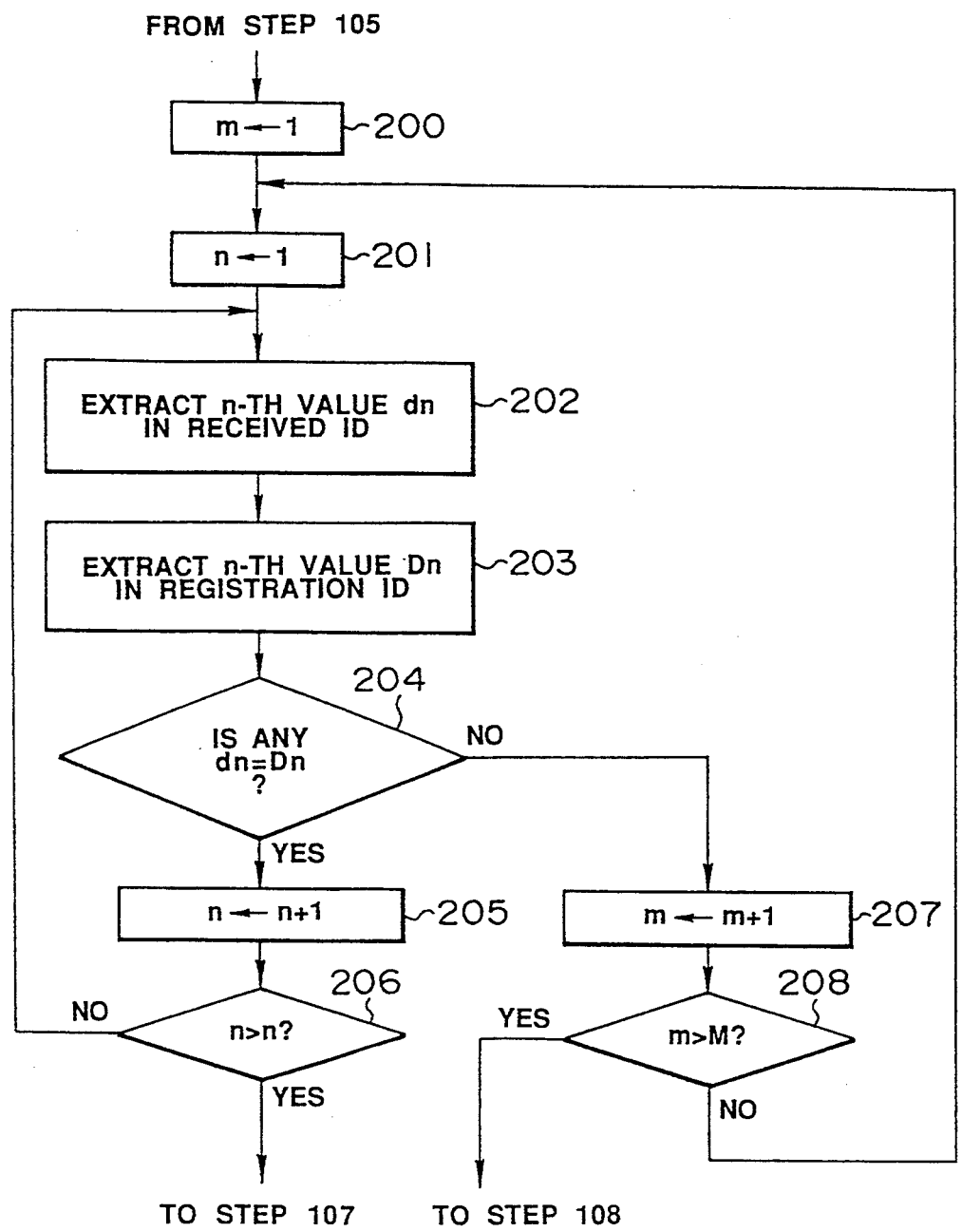
FIG. 4 is a flowchart describing another operation of the embodiment of FIG. 1.

FIG. 4 shows an example of processing of a step, which corresponds to the step 105 in FIG. 3, in this arrangement. In other words, this arrangement is performed by replacing the step 105 in FIG. 3 with the steps 200 to 208 in FIG. 4. In FIG. 4, it is assumed that the number of digits to be compared in each ID number is N. The number N may be changed appropriately. Further, it is assumed that the number of the registration IDs registered in the data memory 7 is M as denoted by $ID_1 - ID_M$ in FIG. 2. The number of the registration IDs may be changed by changing the value M.

In operation, m=1 and n=1 are initially set (steps 200 and 201). Then, the value of the n-th digit dn from the least significant digit of the calling side ID extracted in the step 102 or 104 or received ID, that is the value of the least significant digit d1 since n=1, is extracted (step 202). Then, the value of the n-th digit Dn from the least significant digit of the registration ID (IDn) registered in the data memory 7, that is the value of the lease significant digit D1, is extracted (step 203). It is then checked whether there is any registration ID which satisfies the relationship dn=Dn (step 204). When there is a registration ID satisfying the relationship dn=D, a processing of adding one to n (n - n+1) is executed (step 5) and judgment is made whether or not n>N (step 206).

Control then returns to the step 202 to perform substantially the same operations as mentioned above. That is, coincidence of dn and Dn is checked sequentially from the second least significant digit and when "n" reaches the predetermined N with respect to the same ID, that is, when a relationship n>N is satisfied, control goes to the step 107 in FIG. 3.

When the relationship dn=Dn is not satisfied in every processing in step 204, processing of adding one to m (m - m+1) is executed (step 207), whether the relationship m>M is established is checked (step 208) and then control is returned to the step 201 to again execute the steps 201, 202, 203, 204, 207 and 208.

When it turns out that the calling side ID and the registration ID does not coincide with each other for every registration ID, that is, when the relation m>M is established, the apparatus determines not to permit the closed communication and goes to the step 108 in FIG. 3.

Figure 5:
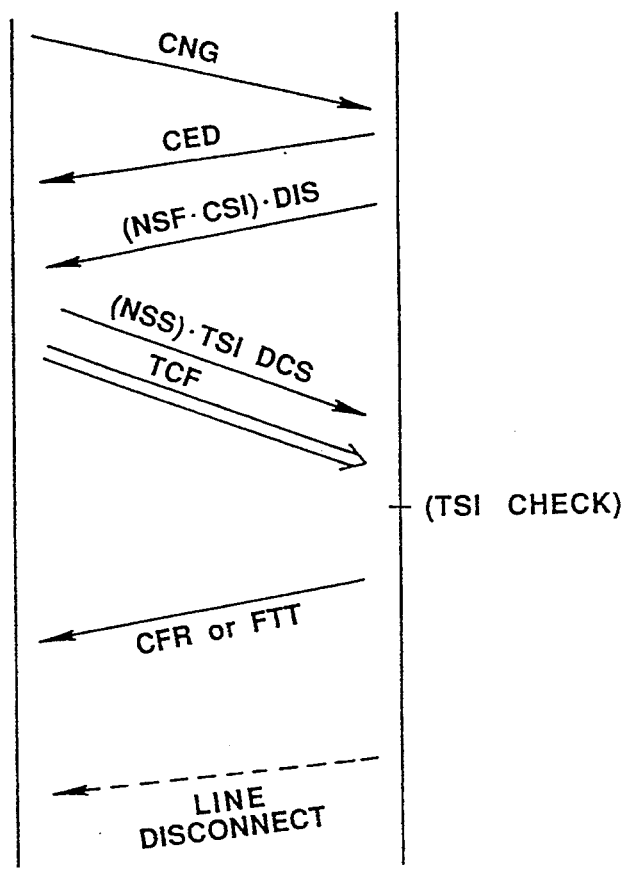
FIG. 5 is a sequence diagram illustrating a transmission procedure when a calling office is a sending office.
Figure 6:
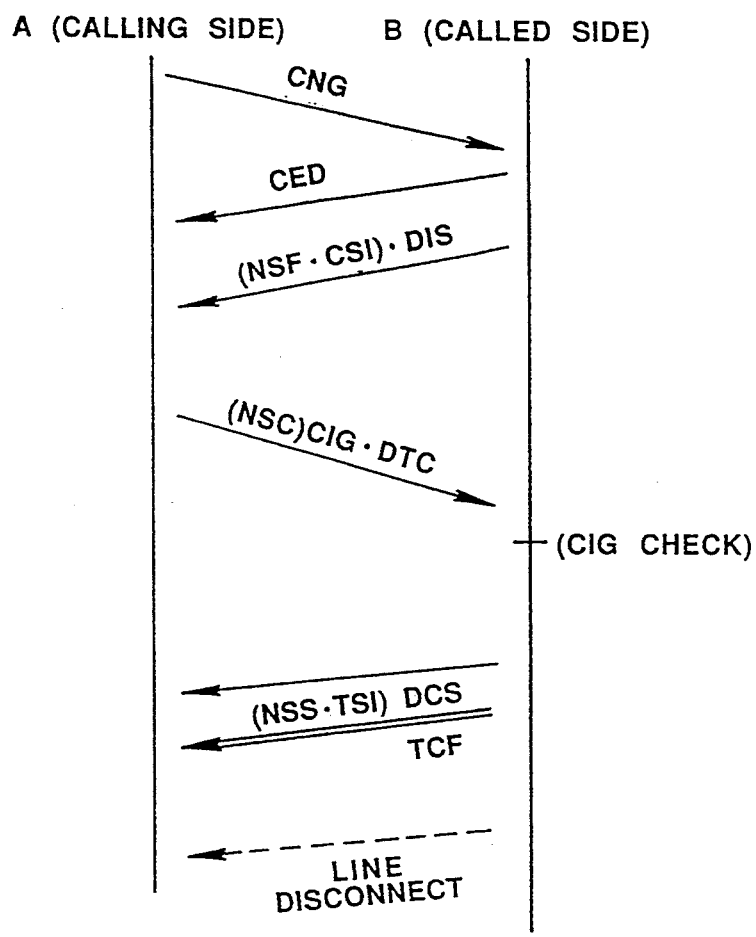
FIG. 6 is a sequence diagram illustrating a transmission procedure when a called office is a sending office.

FIGS. 5 and 6 show examples of control procedures when the processing of FIG. 3 or 4 is carried out. FIG. 5 relates to the procedures when a calling side is an original document sending side, and FIG. 6 relates to the procedures when a called side is an original document sending office.

In FIG. 4, a calling side A transmits a CNG to a called side B. In response to this, the called side B returns a CED to the calling side A, and the calling side A sends to the called side B a non-standard set-up signal (NSS) as an option signal, a TSI and a digital command signal (DCS) as standard signals as well as a training check signal TCF. The called side B monitors the TSI among the received signals (TSI check) and detects a calling side ID from the TSI.

When the call receiver finds a coincidence between the calling side ID detected from the TSI and one of the registration IDs previously registered in the data memory 7 in FIG. 1, the called side B transmits to the calling side A a reception confirmation to receive signal CFR or a failure to train signal FTT and performs a predetermined procedures to move to its closed communication allowing transmission of original document data from the calling side A to the called side B.

The called side, when failing to find a coincidence between the calling side ID detected from the TSI and one of the registration IDs of the data memory 7 in FIG. 1, the called side determines to inhibit the closed communication and releases or breaks the line.

On the other hand, in FIG. 6, a calling side A transmits a CNG to a called side B. In response to this, the called side B returns to the calling side A called station identification signal (CED) and also a non-standard facilities signal (NSF) and a called subscriber identification signal (CSI) as option signals as well as a digital identification signal as a standard signal. Responsive to this, the calling side A sends to the called side B a non-standard facilities command signal NSC as an option signal as well as a calling subscriber identification signal (CIG) and a digital transmit command signal (DTC) as standard signals. The called side B monitors the calling subscriber identification signal (CIG) of these signals (CIG check) and detects a calling side ID from the CIG.

When the called side B finds a coincidence between the calling side ID detected from the CIG and one of the registration IDs previously registered in the data memory 7 in FIG. 1, the called side B transmits to the calling side A the NSS and the TSI as option signals as well as the DCS and a training check signal TCF as standard signals; and performs a predetermined procedure to move to its closed communication allowing transmission of original document data from the called side B to the calling side A.

The called side B, when failing to find a coincidence between the calling side ID detected from the CIG and one of the registration IDs of the data memory 7 in FIG. 1, the called side determines to inhibit the closed communication and releases or breaks the line.

As described the foregoing, in accordance with the present embodiment, the called office detects the identification data of the calling office and the identification data of the party, (i.e., the calling office allowing the closed communication) is registered in the called office so that the call receiver allows the closed communication only when finding a coincidence between both the identification data. As a result, the call receiver can have a communication decision authority of whether to perform the communication, and can communicate only with desired office or offices, whereby any useless reception from the third party can be avoided and thus unnecessary data printing can be prevented.

Since the present invention does not use the option command signal unlike conventional facsimile apparatus, the present invention can carry out closed communication with other types of facsimile apparatuses which use different option commands.

In addition, in accordance with the present embodiment, closed communication can be realized even when the called office is in its automatic reception mode. Thus, even when the user or operator of the called office is absent, the closed communication can be established without any operations by the operator.

What is claimed is:

1. A facsimile apparatus comprising:
   detection means for detecting a calling subscriber identification signal CIG sent from a calling facsimile apparatus attempting to transmit facsimile data for printing, the calling subscriber identification signal CIG being sent in accordance with standardized transmission control procedures;
   extracting means for extracting identification data of the calling facsimile apparatus from the calling subscriber identification signal CIG detected by the detection means;
   memory means for previously storing identification data of a calling facsimile apparatus with which closed communication is to be performed;
   retrieving means for detecting whether or not identification data coincident with the identification data of the calling facsimile apparatus extracted by the extracting means is stored in the memory means; and
   communication control means for allowing the closed communication with the calling facsimile apparatus when the retrieving means detects that the identification data coincident with the identification data of the calling facsimile apparatus extracted by the extracting means is stored in the memory means.

2. A facsimile apparatus as set forth in claim 1, wherein the extracting means extracts a telephone number of the calling facsimile apparatus from the calling subscriber identification signal CIG detected by the detecting means, and wherein the memory means stores, as the identification data of the calling facsimile apparatus with which the closed communication is to be performed, a telephone number of the calling facsimile apparatus with which the closed communication is to be performed.

3. A facsimile apparatus as set forth in claim 2, wherein the retrieving means compares values of a predetermined number of digits from the least significant digit of the telephone number of the calling facsimile apparatus extracted by the extracting means with values of the predetermined number of digits from the least significant digit of the telephone number of the calling facsimile apparatus with which the closed communication is to be performed, and when coincidence is detected between the compared values, generates a detection output.

4. A facsimile apparatus as set forth in claim 1, further comprising:
   printing means for printing the facsimile data received from the calling facsimile apparatus when said communication control means allows the closed communication with the calling facsimile apparatus.

5. A facsimile apparatus comprising:
   detecting means for detecting a transmitting subscriber identification signal TSI sent from a transmitting facsimile apparatus attempting to transmit facsimile data for printing, the transmitting subscriber identification signal TSI being sent in accordance with standardized transmission control procedures;
   extracting means for extracting identification data of the transmitting facsimile apparatus from the transmitting subscriber identification signal TSI detected by the detecting means;

memory means for previously storing identification data of a transmitting facsimile apparatus with which a closed communication is to be performed;

retrieving means for detecting whether or not identification data coincident with the identification data of the transmitting facsimile apparatus extracted by the extracting means is stored in the memory means; and communication control means for allowing the closed communication with the transmitting facsimile apparatus when the retrieving means detects that the identification data coincident with the identification data of the transmitting facsimile apparatus extracted by the extracting means is stored in the memory means.

6. A facsimile apparatus as set forth in claim 5, wherein the extracting means extracts a telephone number of the transmitting facsimile apparatus from the transmitting subscriber identification signal TSI detected by the detecting means, and wherein the memory means stores, as the identification data of the transmitting facsimile apparatus with which the closed communication is to be performed, a telephone number of the transmitting facsimile apparatus with which the closed communication is to be performed.

7. A facsimile apparatus as set forth in claim 6, wherein the retrieving means compares values of a predetermined number of digits from the least significant digit of the telephone number of the transmitting facsimile apparatus extracted by the extracting means with values of the predetermined number of digits from the least significant digit of the telephone number of the transmitting facsimile apparatus with which the closed communication is to be performed, and when coincidence is detected between the compared values, generates a detection output.

8. A facsimile apparatus as set forth in claim 5, further comprising:

printing means for printing the facsimile data received from the transmitting facsimile apparatus when said communication control means allows the closed communication with the transmitting facsimile apparatus.

* * * * *